2,993,840
PROCESS OF PRODUCING HIGHLY PURE ALCOHOL BY EXTRACTIVE DISTILLATION WITH WATER
Francois Xavier Poincet, Paris, France, assignor to Les Usines de Melle (Societe Anonyme), Saint-Leger-les Melle, France, a corporation of the Republic of France
Filed Sept. 30, 1958, Ser. No. 764,440
Claims priority, application France Oct. 7, 1957
6 Claims. (Cl. 202—39.5)

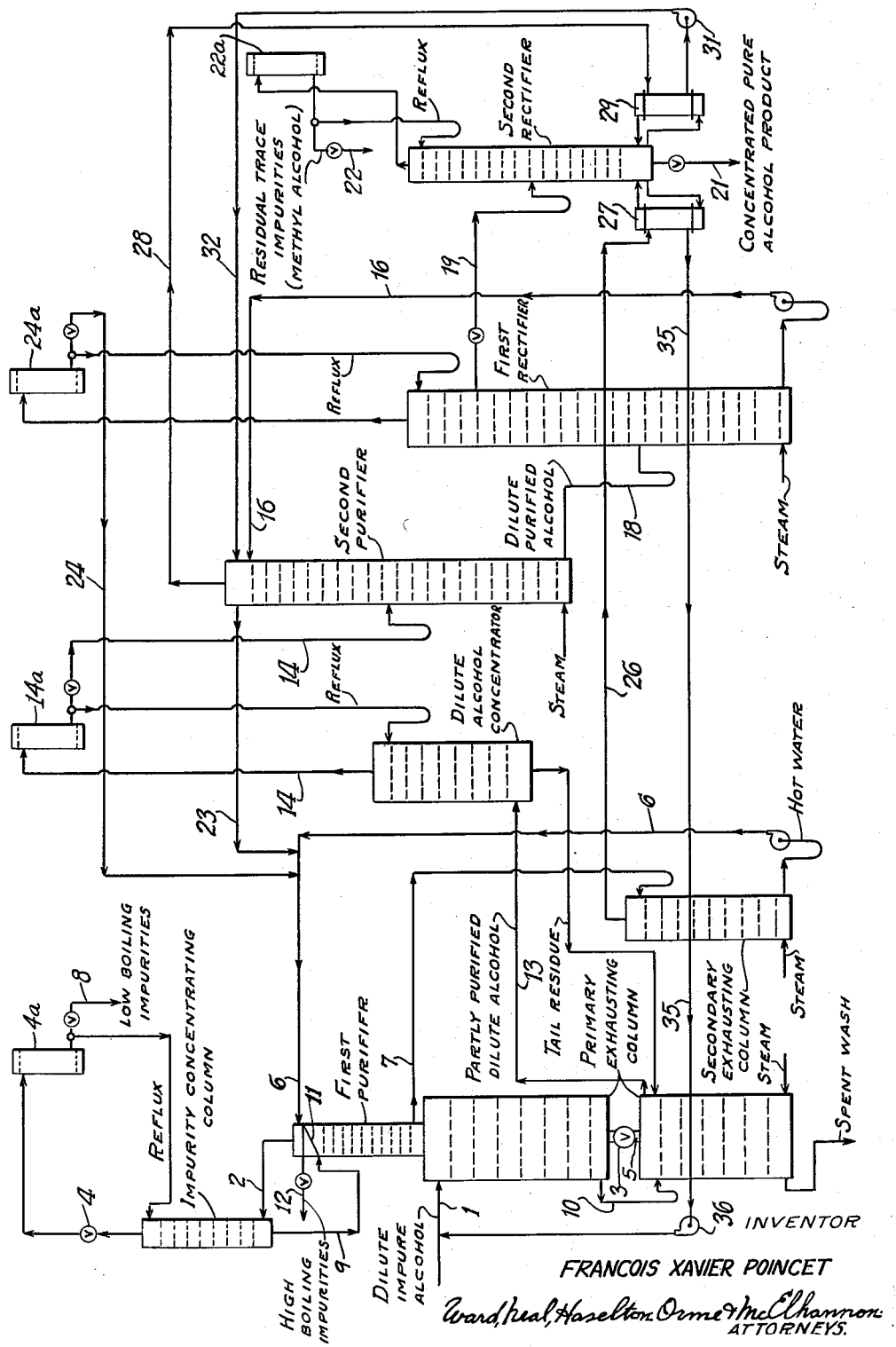

This invention relates to a process for producing concentrated ethyl alcohol of extremely high purity from an impure, dilute aqueous alcoholic solution.

In accordance with conventional practice where a dilute aqueous alcoholic liquid such as a fermented wort is to be purified by extractive water distillation, the impure alcoholic vapors which separate from the wort during distillation of the same in the exhausting column are directly introduced into the purifying column. Water is introduced to the top of this column and head impurities are refluxed to the same point in order to thoroughly separate these impurities from the alcohol and obtain them in highly concentrated form. Impurities in an amount corresponding to the amount introduced in the starting alcoholic liquid are withdrawn from the purifying column. The resulting purified alcohol is then concentrated in a first rectifying column and alcohol withdrawn from this column is finally purified in a second rectifier.

It is also well known that in certain cases better results can be obtained by first concentrating the starting, dilute alcoholic liquid into a phlegm containing 90% alcohol or more and then purifying this phlegm by the conventional extractive distillation method just discussed. Up to the present time this phlegm has been prepared by ordinary distillation of the wort or other dilute impure alcoholic liquid.

According to the present invention it has been found that a high uniform yield of concentrated alcohol of much higher purity can be obtained by first subjecting the starting dilute impure alcoholic liquid to a first extractive distillation, then concentrating the thus purified alcohol to at least 90% by weight to produce a partially purified phlegm. The phlegm is then further purified by subjecting it to a second extractive distillation, and then rectified. By performing these two successive extractive distillations with intermediate concentration it is possible to direct the first extraction more especially to concentrating the impurities, the insoluble fraction of which is preferably separated directly by hot decantation inside the column, and the second extractive distillation more especially to the production of the highly pure alcohol. Furthermore, the process is more flexible than those employed heretofore and allows the recovery of residual heat by a combination of the two extractive distillations, thus diminishing the total heat requirements of the purification.

The process of the present invention may be employed for purifying not only alcoholic fermentation worts but also dilute alcoholic liquids from any source, in particular raw synthetic alcoholic liquids produced by ethylene hydration in a sulfuric medium. Raw alcoholic liquids produced by the hydration of ethylene contain a variety of more or less well identified by-products, certain of which are stable. The more labile by-products, namely, those which upon decomposition give evidence of containing sulfur, are decomposed if the liquid is subjected to ordinary distillation. The raw liquids produced by the hydration of ethylene contain about 8 to 10% by weight of ethyl alcohol. Determination of the various classes of constituent impurities of these liquids with respect to the total amount of ethyl alcohol plus these constituents, gives the following average figures:

| | |
|---|---|
| Ethyl alcohol | 85–90% by weight. |
| Ethyl ether | 10–12% by weight. |
| Hydrocarbons | 0.2–0.7% by weight. |
| Polymers | 0.1–0.5% by weight. |
| Sulfur compounds (reckoned as sulfur) | 2–8 p.p.m. |
| Ketones | Slight amounts. |

A further advantage of the present invention is that it permits recovery as oils of the labile sulfur compounds which would normally at least partially decompose in the course of an ordinary distillation as conventionally performed for preparing the phlegm prior to extractive distillation.

The present invention will now be more fully described with reference to the annexed drawing, which is a schematic flow diagram of the process. It will be seen that the advantages of the present process may be realized regardless of the source of the starting, dilute aqueous alcohol.

The dilute alcoholic liquid is fed through pipe 1 to the head of an exhausting column having upper and lower sections joined by a riser 5 and provided with a connecting downflow pipe 10. The vaporous mixture of alcohol and impurities which separates as the liquid flows downwardly in the upper section of this column is directly introduced to the base of a first purifier column, preferably arranged immediately above the exhausting column, wherein those impurities which are separable by extractive distillation, that is to say, substantially all of the impurities except methyl alcohol, acids if any, and certain complex compounds the elimination of which will be discussed hereinafter, are removed.

The impurities separated in the first purifier are introduced through overhead pipe 2 into an impurity concentrating column. The flow of heat which passes upwardly through the first purifier is controlled by means of a valve 3 in riser 5 and/or at the extreme top of the apparatus by means of a valve 4 in the pipe through which the overhead vapors leave the top of the impurity concentrating column and passed to reflux condenser 4a.

Hot water for the extraction is introduced to the top of the first purifier through pipe 6. The water may come from any available source, but is preferably drawn from the base of a secondary exhausting column, often referred to as a "lutter" column. The secondary exhausting column is fed at its top with the aqueous liquid withdrawn from the base of the first purifier through pipe 7. This arrangement allows the available heat in the secondary exhausting column to be used for heating the final rectifying column, as explained hereinafter. Hot water may also be supplied to the top of the first purifier from the base of an exhausting section (not shown) which may be arranged under the dilute alcohol concentrator. Such an exhausting section, where used, is in lieu of the secondary exhausting column and receives the tail residue from the concentrator and recovers alcohol therefrom.

Under the combined influence of the flow of heat passing through the first portion of the system, that is, the primary exhausting column, the first purifier and the impurity concentrating column, and of the extractive water fed to the top of the first purifier, the low boiling impurities, such as aldehydes, esters, ethers and low hydrocarbons as the case may be, are concentrated in the top of the impurity concentrating column. These low boiling impurities are withdrawn from the system through pipe 8. On the other hand, the high boiling impurities, such as fusel oils in the case of fermentation alcohol and sulfur oils in the case of alcohol from ethylene hydration, are refluxed from the bottom of the impurity concentrating column through pipe 9 to the head portion of the first purifier which is provided with a hot decanter or a decanting plate 11. The hot extractive water is introduced to this plate. High boiling impurities collect in the upper layer on the decanting plate and are withdrawn from the system through pipe 12. The very small quantity of alcohol present in the upper portion of the first purifier, especially on the decanting plate, permits exhaustive washing of the impurities and substantially avoids alcohol losses. In fact, washing is so efficient that this decanter is used for recovering alcohol from the fusel oil-containing fractions withdrawn from the rectifying columns of the system, which fractions for this purpose are recycled to this decanting plate. The impurities withdrawn from the decanter may advantageously be subjected to a subsequent cold decantation (not shown).

Partly purified dilute alcoholic liquid is withdrawn from the top of the lower section of the exhausting column through pipe 13 and introduced to an alcohol concentrating column. The function of this column is to concentrate the alcohol up to a critical minimum of at least 90% by weight. If concentrated to less than 90%, the purity of the final product is not sufficiently high. This concentration liberates impurities which are blocked as complexes. These complexes are mainly of the acetal or sulfone type which are stable and soluble in the dilute hydro-alcoholic medium. Concentration of the alcohol breaks down the complexes and liberates these blocked impurities. The partly-purified phlegm, from which the residual impurities have been so liberated, is then introduced by way of reflux condenser 14a in pipe 14 to a second purifier, which is an extractive distillation column fed at its top through pipe 16 with the spent wash from the base of the first rectifier.

The second purifier is steam heated with from 25,000 to 30,000 kilocalories per hectoliter of pure alcohol. Dilute, purified alcohol issuing through pipe 18 at the base of this purifying column is introduced to a first rectifier, which is provided with reflux condenser 24a. The concentrated alcohol is withdrawn near the top of this rectifier through pipe 19 and introduced to a second rectifier provided with a reflux condenser 22a. Concentrated, highly pure alcohol product is withdrawn from the base of the second rectifying column through pipe 21. The residual traces of impurities impossible to remove by extractive distillation and which can be separated only in a substantially anhydrous medium are withdrawn overhead through pipe 22.

All of the overhead impurities from the second purifier and the first rectifier are recycled to the head of the first purifier through pipes 23 and 24 respectively which preferably join hot water pipe 6. This feature reduces the number of impurity withdrawal points in the system to only three, namely, the low boiling impurities at 8, the high boiling impurities at 12 and the residual impurities at 22. This reduction in the number of impurity withdrawal points avoids alcohol losses which always result from handling the alcoholic liquids outside of the system. The recovery or yield of alcohol is increased accordingly.

The liquid in the second rectifier is preferably heated by the dilute alcoholic vapors issuing through pipe 26 from the head of the secondary exhausting column in a heat exchanger 27. The resulting condensed dilute alcohol is returned to the upper part of the exhausting column by pipe 35, pump 36 and pipe 1. Since these dilute vapors are not sufficient to ensure adequate heating of the second rectifier, vapors issuing from the top of the second purifier may be simultaneously used for this purpose. The overhead vapors are led to a reboiler 29 through pipe 28 and the condensed vapors refluxed to the second purifier by pump 31 and pipe 32. The second rectifier may thus be operated without supplying additional heat to the system.

In this connection, the impurity concentrating column is as already noted heated directly by the overhead vapors of the first purifier, and the total heat consumption throughout the system is lower than in a conventional extractive distillation.

The quality, i.e. purity, of the final alcohol product of the present process is greatly improved over that heretofore possible by simple extractive distillation, notwithstanding the fact that by reason of the high concentration of impurities in the upper part of the first purifier and in the impurity concentrating column some traces of these impurities are found in the dilute alcoholic liquid withdrawn from the exhausting column through pipe 13. The intermediate concentration of this dilute alcohol to a phlegm insolubilizes otherwise blocked impurities and the combination therewith of a second extracting operation enables the production of such a high quality product. A relatively high proportion of impure alcoholic products is withdrawn from the top of the second purifier through pipe 23 in order to insure a perfectly pure smell and taste to the final product. The impure alcohol so withdrawn from the top of the second purifier is recycled to the head of the first purifier where the impurities are removed by decantation and the alcohol recovered. The alcohol yield is extremely high owing to the high concentration of the impurities at the top of the first purifier, due to the action of the impurity concentrating column.

The uniformly high purity and yield of the alcohol product are further increased by the fact that the alcohol undergoes a second extractive distillation after having been subjected to a first extraction, the latter preceding concentration up to at least 90% by weight. In conventional processes, though all reasonable efforts are made to remove all of the separable impurities during extractive distillation, the presence of substantial amounts of impurities blocked as complexes, which liberate only during the step of concentrating the alcohol, results in a final product still containing substantial amounts of such impurities. It will be recalled that in the conventional process the starting alcoholic liquid containing all of its impurities is concentrated to a phlegm prior to extractive distillation. Such initial concentration breaks down the complexes and liberates blocked impurities, but the phlegm so produced, owing to its high content of these impurities, is able to produce new complexes as soon as it becomes diluted again, that is during the subsequent extractive water distillation. Of course, the quantity of the new complexes so formed is smaller than the quantity of complexes in the starting alcohol, nevertheless they are present in substantially more than simply negligible amounts. After rectification, the alcohol product so produced is not nearly so pure as that produced by the present process.

By conducting a first extractive water distillation and then concentrating to a phlegm, the phlegm so obtained contains only very slight traces of impurities and is such that in the course of the subsequent extractive water distillation, only infinitesimal traces of complexes can be formed therein. Under such conditions, the final alcohol obtained contains negligible traces of impurities.

The rate of withdrawal of impurities from the several columns will of course vary according to the proportion of impurities present in the raw alcohol to be treated. The degree of purity will depend upon the source of the alcohol, for example, in the case of an alcohol produced by ethylene hydration the purity depends upon the various conditions of the hydration operation, and especially upon the purity of the ethylene employed.

The following non-limiting examples set forth the presently preferred process of the present invention as the same is applied to the purification of a fermentation wort and of an alcoholic liquid produced by the hydration of ethylene in the apparatus above described.

Example I

A wort containing 5% by volume of ethyl alcohol, produced by the fermentation of a beetroot molasses must, that is, a 25% aqueous solution of beet molasses, and previously heated, was introduced to the upper section of the exhausting column at the rate of 32,000 kg. per hour. A mixture of alcohol and impurities ascended the first purifier countercurrent to hot extractive water which was fed to the top of the purifier. Liquid from the base of the upper section of the exhausting column was allowed to flow downwardly into the lower portion of said column, which was heated at its base by steam injection so that all of the alcohol present was distilled off. The residual spent aqueous wash was withdrawn from the base of the lower section of the column and discarded.

Since the amount of heat required to exhaust the wort in the lower section of the column, namely 90,000 kilocalories per hectoliter of pure alcohol, is substantially above that required to produce the intermediate phlegm in the concentrating column, the excess heat was employed for operating the upper section of the exhausting column, the first purifying column and the impurity concentrating column.

The mixture of alcohol and impurities issuing from the top of the exhausting column was subjected to extractive distillation in the first purifier, fed at its top with hot water as aforesaid. A part of the dilute alcohol at the base of the first purifier was sent to the top of a secondary exhausting column, and the remainder allowed to flow back into the upper section of the exhausting column. The secondary exhausting column was heated at its base with steam in amount equivalent to 50 kg. per hectoliter of pure alcohol. The spent wash from the base of this column was pumped back to the head of the first purifier as the extractive water at the rate of 3,000–3,500 liters per hour, i.e. approximately 200% with respect to the weight of alcohol contained in the starting fermented wort. The extracting action of this water produced a high concentration of impurities in the head part of the first purifier, which were further concentrated in the associated concentrating column for that purpose. The low boiling impurities, including aldehydes and lower esters, were withdrawn at the top of the concentrating column, condensed, a portion refluxed to the column and the remainder withdrawn from the system. The reflux coefficient i.e. the ratio of the volume of condensate refluxed to the top of the column to the volume of condensate withdrawn per unit time, was about 50. The high boiling impurities, such as fusel oils and higher esters, were returned from the base of the column to a decanting plate in the upper part of the first purifier from which they were withdrawn as the upper layer. The total quantity of impurities withdrawn, both low boiling and high boiling was 24.5 kg. per hour constituted as follows:

| | Kgs. |
|---|---|
| Aldehydes | 1.5 |
| Esters | 3.2 |
| Fusel oils | 4.8 |
| Alcohol | 3.0 |
| Water | 12.0 |

The thus purified hydro-alcoholic vapors which separated from the residual aqueous liquid in the lower section of the exhausting column were withdrawn from the top of the lower section and introduced to a concentrating column, the tail residue from which was returned to the top of the lower section of the exhausting column. The alcohol was concentrated up to 90% by weight therein and then introduced to the middle of a second purifying column, which was heated at its base with steam at the rate of 50 kg. per hectoliter of pure alcohol. Spent wash from the first rectifier was fed to the top of the second purifier at the rate of 10,000–12,000 liters per hour, or 700–750% with respect to the weight of the alcohol contained in the starting wort. By the extractive action of this spent wash, impurities collected in the head part of the second purifier and were removed therefrom and sent back to the top of the first purifier from which they were subsequently removed from the system. The vapors issuing from the top of the second purifier were at a temperature of 96° C. and contained 25,000–30,000 kilocalories per hectoliter of pure alcohol. These vapors were sent to the reboiler of the second rectifier. This heat in part served to operate the second rectifier. The condensed vapors from the reboiler were refluxed to the top of the second purifier. The reflux coefficient was approximately 50.

Purified dilute alcohol was withdrawn from the base of the second purifier and introduced to the middle of the first rectifier in accordance with conventional methods. The concentrated alcohol was removed from the first rectifier near its top and introduced to the middle of a second rectifier. This final column, as aforesaid, was heated in part by the head vapors from the second purifier, and also by dilute alcohol vapors recovered in the secondary exhausting column. These latter vapors were at a temperature of 96° C. and contained about 25,000 kilocalories per hectoliter of pure alcohol.

There was finally obtained at the bottom of the second rectifier a highly pure alcohol of a concentration of 95% by weight. The remainder was water, and there were virtually no impurities present in the product. The rate of withdrawal of alcohol product from the base of the second rectifier was 1679 kg. per hour, for a yield of 99.7%. Methyl alcohol was recovered as a by-product from the head of this column.

If the purification of the same alcoholic starting material is carried out in accordance with conventional practice, the yield amounts to 98–99% only, the alcohol obtained still contains traces of complex-forming impurities as disclosed, and finally the consumption of heating steam per hectoliter of pure alcohol is 50 kg. higher than in the process of the present invention.

Example II

Into the top of the upper portion of the exhausting column there was introduced 1,000 kg. per hour of raw, aqueous alcoholic liquid produced by the hydration of ethylene in a sulphuric medium. The aqueous medium contained 10% by weight of impure ethyl alcohol having the following composition:

| | |
|---|---|
| Ethyl alcohol | 90% by weight. |
| Ethyl ether | 9.4% by weight. |
| Polymers | 0.3% by weight. |
| Hydrocarbons | 0.2% by weight. |
| Ketones | 0.1% by weight. |
| Sulfur | Traces (5 p.p.m.). |

The exhausting column, first purifier and impurity concentrating column were operated as set forth in Example I, with the exception that the quantity of heat added as steam to the base of the exhausting column was about 50,000 kilocalories per 100 kg. of ethyl alcohol contained in the starting liquid, and extractive water from the base of the secondary exhausting column was introduced to the top of the first purifier at the rate of 180 kg. per 100 kg. of ethyl alcohol. All of the ethyl ether and low boiling hydrocarbons was withdrawn from the top of the impurity concentrating column while the insoluble oils collected in the upper layer of the decanting plate in the top of the first purifier, from which they were removed.

The purified aqueous alcoholic vapors issuing from the top of the lower section of the exhausting column were concentrated to 90% by weight alcohol as in Example I. The thus concentrated phlegm was subjected to a second extractive distillation wherein the second purifier was heated with 50 kg. of steam per hectoliter of pure alcohol and fed at its top with the spent wash from the first rectifier at the rate of 650–700 liters per hour, i.e. about 700–800% with respect to the weight of ethyl alcohol contained in the starting liquid. The second purifier and annexed devices were operated as set forth in Example I.

The purified alcohol from the second extractive distillation was twice rectified as set forth in Example I, and the final product contained 95% by weight alcohol and the balance water. It had no odorous impurities. Product was withdrawn from the system at the rate of 95 kg. per hour, for yield of 95%.

This yield was somewhat lower than that obtained in Example I with fermentation alcohol, but is nevertheless excellent in view of the highly impure state of the starting aqueous alcoholic liquid.

I claim:

1. A process for producing highly pure, concentrated alcohol from an impure dilute aqueous alcoholic solution, which comprises subjecting said solution to a first extractive distillation in a distilling column having a decanter in its head part, introducing hot extractive water to said decanter, concentrating impurities collected at the top of the column and withdrawing them, withdrawing thus partly purified, dilute aqueous alcohol from the first extractive distillation and concentrating the same to at least 90% by weight alcohol to form a partly purified phlegm, subjecting said phlegm to a second extractive distillation with hot water in a second distilling column, withdrawing an alcohol-containing aqueous liquid containing substantially the whole of the remaining impurities in diluted condition from the head of said second column and returning the same to the first extractive distillation, withdrawing further purified dilute alcohol from the lower portion of said second column and rectifying the thus purified dilute alcohol to concentrate the same.

2. A process for producing highly pure, concentrated alcohol from an impure dilute alcoholic solution, which comprises subjecting said solution to a first extractive distillation in a distilling column having a decanter in its head part, introducing hot extractive water to said decanter, distilling the overhead vapors from said column to concentrate the impurities in an auxiliary column, condensing the overhead vapors from the auxiliary column, withdrawing a portion of the condensed vapors comprising low boiling impurities from the system and refluxing the remainder to the auxiliary column, refluxing liquid comprising high boiling impurities from the bottom of said auxiliary column to the decanter, withdrawing the upper, impurity-laden layer from the decanter, withdrawing thus partly purified, dilute aqueous alcohol from the first extractive distillation and concentrating the same to at least 90% by weight alcohol to form a partly purified phlegm, subjecting said phlegm to a second extractive distillation with hot water in a second distilling column, withdrawing an alcohol-containing aqueous liquid containing substantially the whole of the remaining impurities in diluted condition from the head of said column and returning the same to the first extractive distillation, withdrawing further purified dilute alcohol from the lower portion of said second column and rectifying the thus purified dilute alcohol to concentrate the same.

3. A process for producing highly pure, concentrated alcohol from an impure dilute alcoholic solution, which comprises subjecting said solution to a first extractive distillation in a distilling column having a decanter in its head part, introducing hot extractive water to said decanter, concentrating impurities collected at the top of the column and withdrawing them, withdrawing thus partly purified, dilute aqueous alcohol from the first extractive distillation and concentrating the same to at least 90% by weight alcohol to form a partly purified phlegm, subjecting said phlegm to a second extractive distillation with hot water in a second distilling column, withdrawing an alcohol-containing aqueous liquid containing substantially the whole of the remaining impurities in diluted condition from the head of said column and returning the same to the head of the first extractive distillation column, withdrawing further purified dilute alcohol from the lower portion of said second column, subjecting the purified dilute alcohol to a first and then to a second rectification to produce a concentrated alcohol solution, withdrawing water from the first rectification and feeding the same to the second extractive distillation as hot extractive water.

4. A process for producing highly pure, concentrated alcohol from an impure dilute aqueous alcoholic solution containing methanol as an impurity, which comprises subjecting said solution to a first extractive distillation in a distilling column having a decanter in its head part, feeding said decanter with hot extractive water, withdrawing a portion of the liquid from the base of the extractive distilling column, introducing the same to a secondary exhausting column for recovering alcohol therefrom, withdrawing water from the base of said exhausting column and employing the same as hot extractive water feed to said decanter, concentrating impurities collected at the top of the distilling column and withdrawing them, withdrawing thus partly purified, dilute aqueous alcohol from the first extractive distillation and concentrating the same to at least 90% by weight alcohol to form a partly purified phlegm, subjecting said phlegm to a second extractive distillation with hot water in a second distilling column, withdrawing an alcohol-containing aqueous liquid containing substantially the whole of the remaining impurities in diluted condition from the head of said second column and returning the same to the first extractive distillation, withdrawing further purified dilute alcohol from the lower portion of said second distilling column, rectifying the thus further purified dilute alcohol to concentrate the same and further rectifying the concentrated alcohol to remove the methanol therefrom.

5. A process as set forth in claim 4 wherein the liquid in the further rectification is heated through heat exchange with alcohol vapors from the head of the secondary exhausting column and also through heat exchange with vapors from the head of the column wherein the second extractive distillation is carried out.

6. A process for producing highly pure alcohol from an impure dilute alcoholic solution, which comprises counter-currently contacting the dilute impure solution with hot extractive water in a distilling column, collecting and concentrating impurities in the top of said column and withdrawing the same therefrom in highly concentrated condition and containing but a low proportion of alcohol, concentrating the thus purified aqueous solution to at least 90% by weight alcohol to form an intermediate phlegm, subjecting the phlegm to a second extractive distillation with hot water in another distilling column, withdrawing an alcohol-containing aqueous liquid containing substantially the whole of the remaining impurities in diluted condition from the top of said other column, returning said alcohol-containing liquid to the first column, withdrawing thus purified dilute aqueous alcohol from the base of said other column and rectifying the same.

References Cited in the file of this patent

UNITED STATES PATENTS

| | | |
|---|---|---|
| 2,610,141 | Drout | Sept. 9, 1952 |
| 2,638,440 | Drout | May 12, 1953 |
| 2,663,679 | Drout | Dec. 22, 1953 |
| 2,828,249 | Maze-Sencier | Mar. 25, 1958 |
| 2,878,167 | Alheritiere et al. | Mar. 17, 1959 |